INVENTORS
KO MUROGA
JIRO OKUDA
BY
OSTROLENK, FABER, GERB & SOFFEN
ATTORNEYS

INVENTORS
KO MUROGA
JIRO OKUDA
BY
OSTROLENK, FABER, GERB & SOFFEN
ATTORNEYS

INVENTORS
KO MUROGA
JIRO OKUDA

BY

OSTROLENK, FABER, GERB & SOFFEN
ATTORNEYS

INVENTORS
KO MUROGA
JIRO OKUDA
BY
OSTROLENK, FABER, GERB & SOFFEN
ATTORNEYS

INVENTORS
KO MUROGA
JIRO OKUDA
BY
OSTROLENK, FABER, GERB & SOFFEN
ATTORNEYS

INVENTORS
KO MUROGA
JIRO OKUDA
BY
OSTROLENK, FABER, GERB & SOFFEN
ATTORNEYS

United States Patent Office 3,235,664

Patented Feb. 15, 1966

3,235,664

BIDIRECTIONAL CODE TRANSLATION CIRCUIT

Ko Muroga and Jiro Okuda, Tokyo, Japan, assignors to Nippon Electric Company Limited, Tokyo, Japan Filed Feb. 13, 1962, Ser. No. 172,927
Claims priority, application Japan, Feb. 14, 1961, 36/5,054
5 Claims. (Cl. 179—18)

This invention relates to code translation circuits of the kind such as used in telephone switching systems. The common control type telephone switching system is required to perform the function of translating subscriber numbers into their corresponding equipment numbers which is necessary for establishing the connection between calling and called parties, and at the same time, a reverse function of translating the equipment number into the subscriber number. With the conventional crossbar switching equipment, the former and the latter functions have been performed respectively by the number group and the identifier—that is, two different functional units.

The object of this invention is to provide a bidirectional code translation circuit capable of performing such code translation in both directions, economically with one common functional unit.

The instant invention overcomes the necessity for two separate encoding and decoding arrangements by employing a unique arrangement which permits the use of one common electronic network which may be employed for both encoding and decoding operations, and which further operates in a more rapid and reliable manner than the electro-mechanical systems known to the prior art.

The instant invention consists of a bidirectional code translation circuit which is comprised of two or more expansion circuits. Each expansion circuit is provided with a requisite number of control terminals which correspond in number to the number of input terminals of information which may be impressed thereupon. The required number of output terminals is also provided within each expansion circuit, the number of which are equal to the number of possible code combinations translatable from the input information. These expansion circuits are interconnected by a jumper arrangement through their output terminals so as to form the predetermined code combination desired.

Each expansion circuit is provided with counting means and detector means so that when one expansion circuit is receiving input information the second expansion circuit connected thereto decodes this input information by comparing the condition of the counter with the input information impressed therein, wherein the counter is stepped one count at a time until its condition compares with the predetermined decoding arrangement. At this time, the comparison is recognized by the detector means which prevents the counter from stepping further, and simultaneously identifies the fact that coincidence has occurred.

In the reverse direction, the second expansion circuit counting means is disabled so that information may be impressed directly upon the second expansion circuit while the counting means of the first expansion circuit steps in the same manner as described immediately above so as to enable the first expansion circuit to perform the decoding operation.

It is, therefore, one object of this invention to provide a bidirectional code translation system having a novel circuit which may be employed for both the encoding and decoding operations at each exchange location.

Another object of this invention is to provide a bidirectional code translation circuit which is so arranged as to recognize a predetermined code translation condition by means of comparing the state of a counter means associated therewith with the state of the input signals impressed upon the expansion circuit.

These and other objects of this invention will become apparent when reading the accompanying disclosure and drawings in which.

Figures 7, 7A:
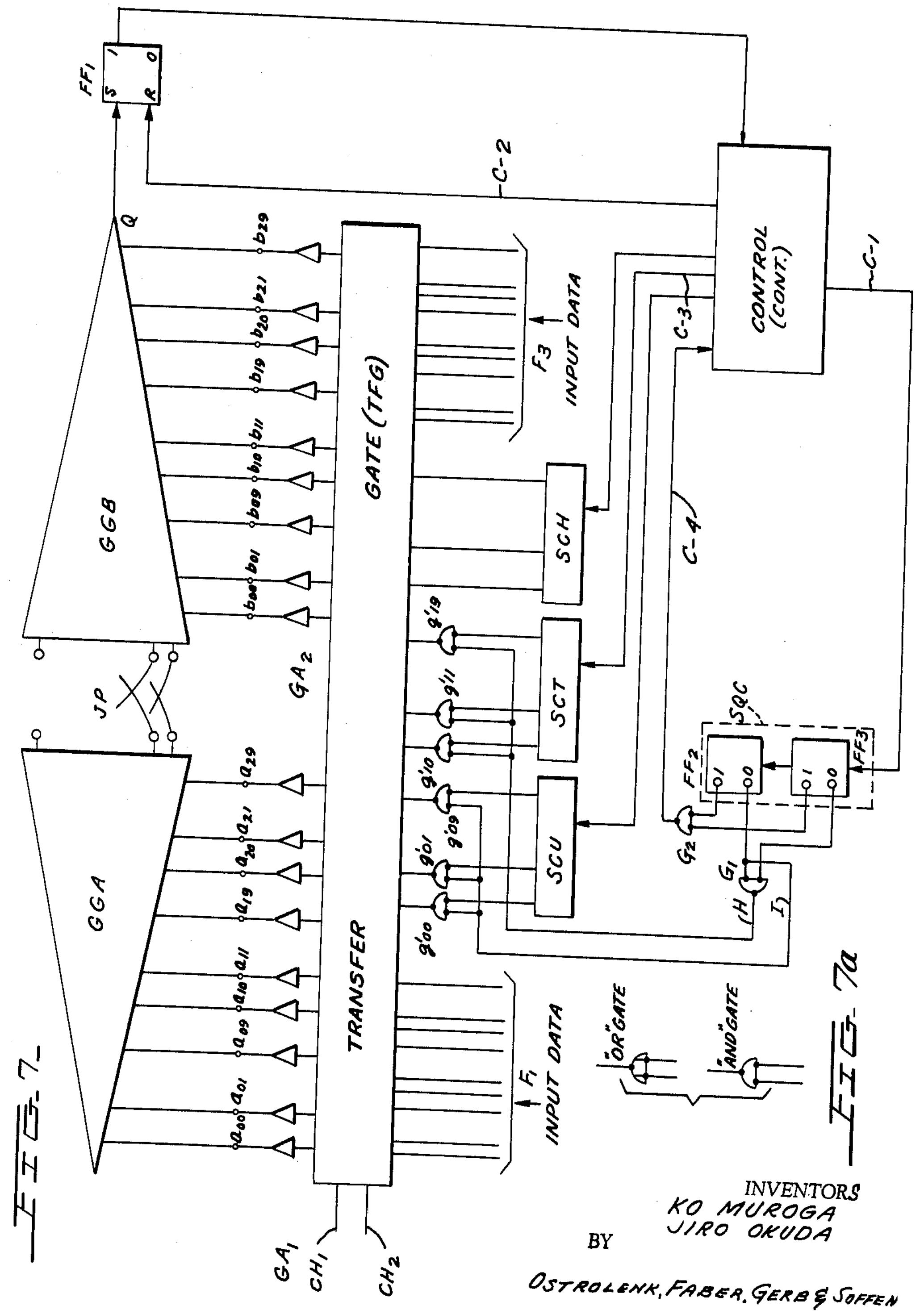
FIGURE 7 is a block diagram showing the bidirectional code translation system of the instant invention.

FIGURE 7*a* shows the symbolic representation of the OR gates and AND gates which appear in the figures of the instant application.

Figure 8:
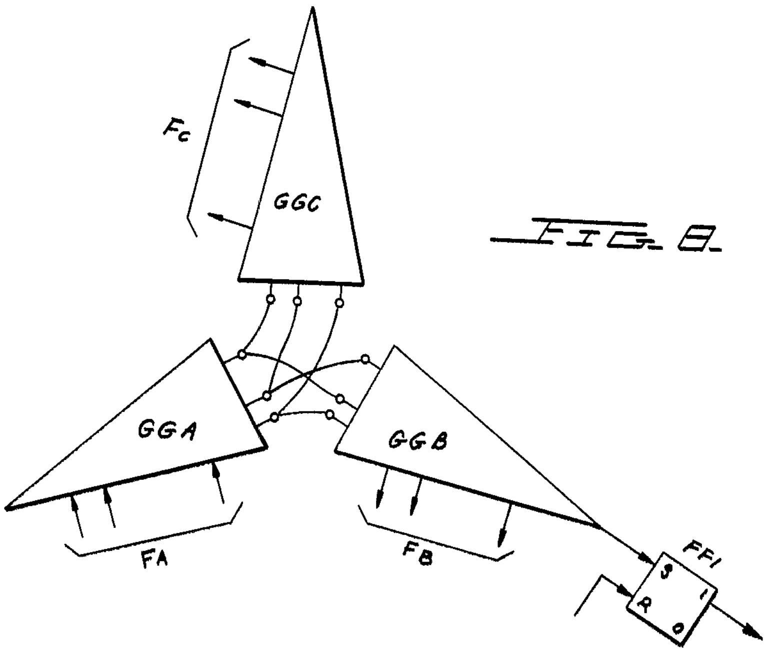
Figure 9:
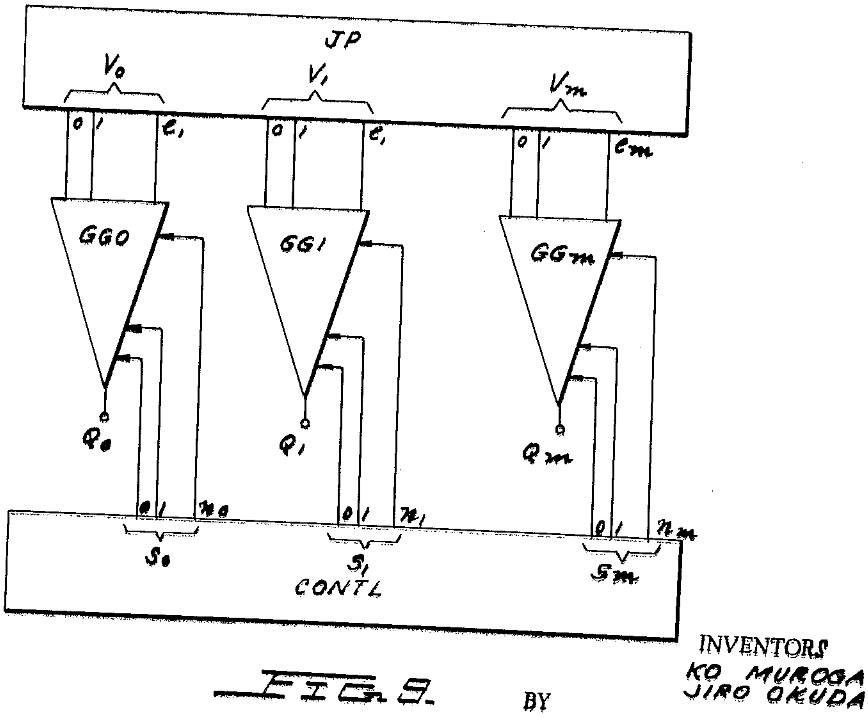

FIGURES 8 and 9 are diagrammatic representations of modifications of the bidirectional code translation system of FIGURE 7 which have been modified to perform operations somewhat different from the system shown in FIGURE 7.

Figure 1:
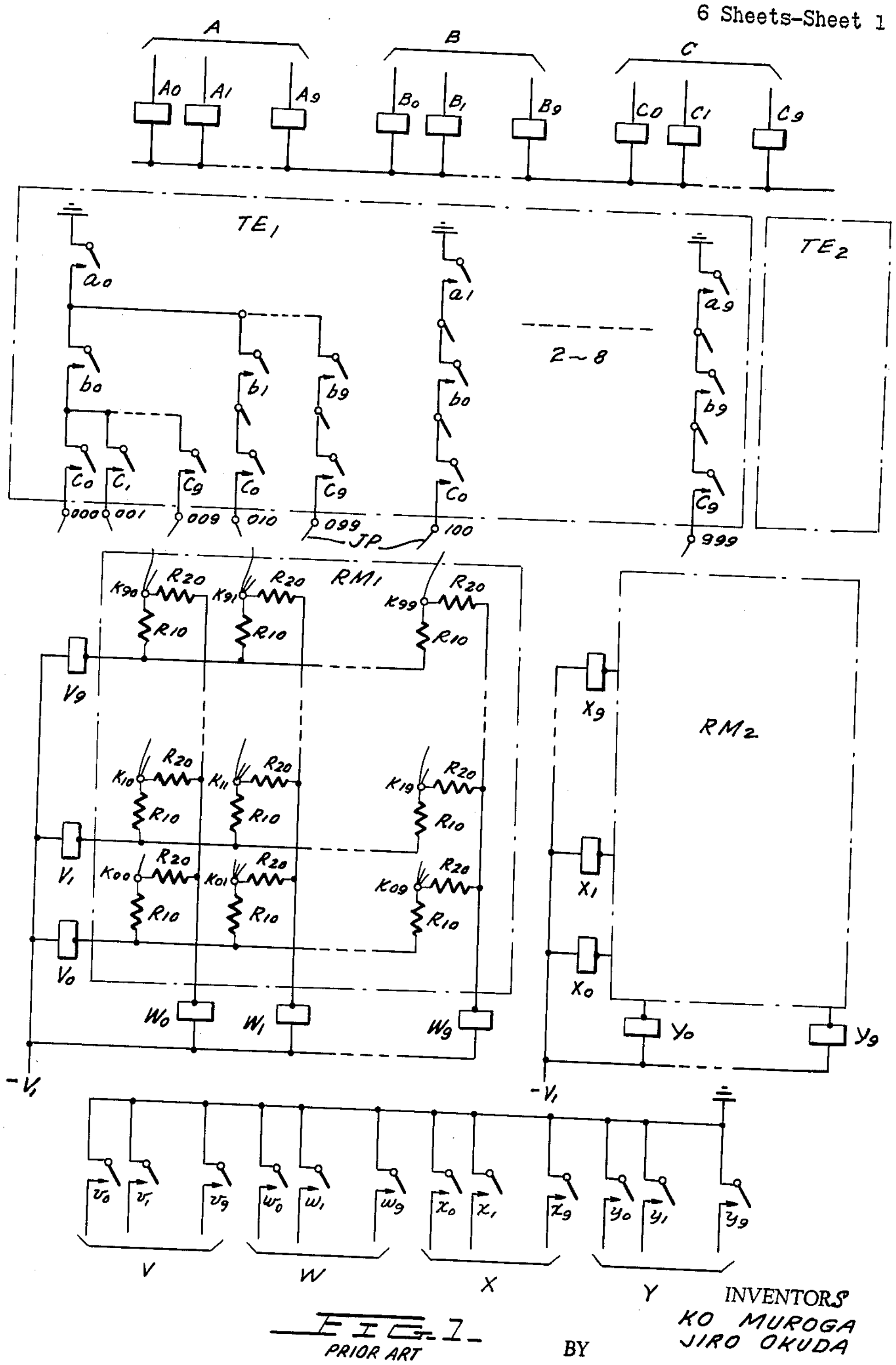
FIG. 1 PRIOR ART
FIGURE 1 is a circuit diagram of a prior art relay code translation circuit.

Prior to entering into details of this invention, the conventional code translation circuit will be outlined. FIGURE 1 illustrates the relay code translation circuit used in the number group in a conventional crossbar switching system. Referring to this figure, input terminal groups A, B and C denote input information to be code-translated while output terminal groups V, W, X and Y denote code-translated output information.

$A_0, A_1 \ldots A_9$; $B_0, B_1 \ldots B_9$; $C_0, C_1 \ldots C_9$; $V_0, V_1 \ldots V_9$; $W_0, W_1 \ldots W_9$; $X_0, X_1 \ldots X_9$; $Y_0, Y_1 \ldots Y_9$ denote relays; and, $a_0, a_1 \ldots a_9$; $b_0, b^1 \ldots b_9$; $c_0, c_1 \ldots c_9$; $v_0, v_1 \ldots v_9$; $w_0, w_1 \ldots w_9$; $x_0, x_1 \ldots x_9$; $y_0, y_1 \ldots y_9$ denote contacts of their corresponding relays.

Both $TE_1$ and $TE_2$ denote relay tree-type expansion circuits while both $RM_1$ and $RM_2$ denote resistance networks in which resistors R10's and R20's are combined. Jumper wiring JP is for connecting the output terminals (000), (001) . . . (999) to the terminals $k_{00}, K_{01} \ldots K_{11} \ldots K_{99}$ of the resistance network $RM_1$. If the input formation groups A, B and C are delivered in the form of "1-out-of-10" codes, only one relay operates in each of the relay groups $A_0 \ldots A_9$, $B_0 \ldots B_9$, and $C_0 \ldots C_9$. Then, one of the 1,000 output terminals of the relay type expansion circuit $TE_1$ comprising the contacts of the relay groups is grounded, with the result that one of the 100 terminals $k_{00} \ldots k_{99}$ of the resistance network which has been connected to the grounded output by the jumper wiring is grounded. Thus one relay in relay group $V_0 \ldots V_9$ and one relay in relay group $W_0 \ldots W_9$ operate through resistors $R_{10}$ and $R_{20}$ respectively, appearing as translated codes V and W. If the two kinds of translated code outputs are insufficient, another relay type expansion circuit $TE_2$ and another resistance network may be annexed to translate codes to output codes X and Y. In such a way, input information A, B and C undergoes code translation to obtain coded outputs V, W, X and Y.

Figure 2:
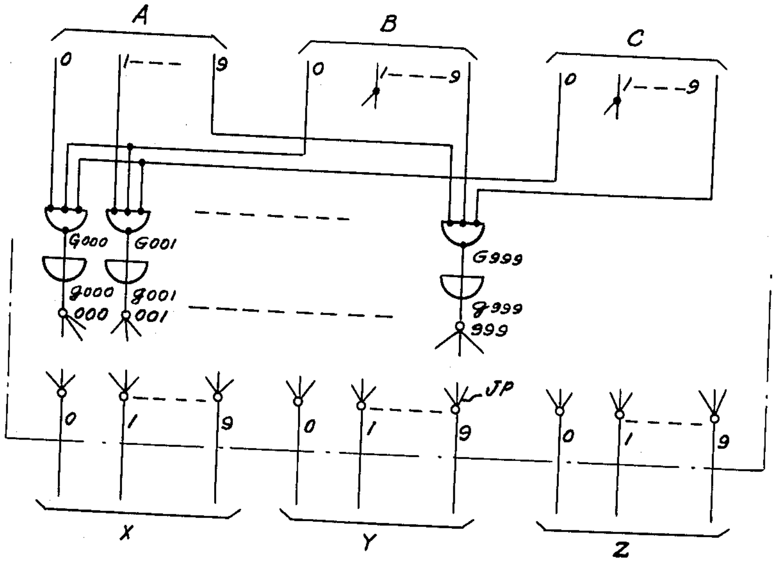
FIGURE 2 is a logical circuit diagram of an electronic code translation circuit which may be employed in the system of the instant invention.

FIGURE 2 illustrates an example of the electronic code translation circuit. The output terminals (000) . . . (999) of the logical network composed of 1000 "AND" circuits $G_{000}$ through $G_{999}$ and 1000 "OR" circuits $g_{000}$ through $g_{999}$ are connected in accordance with the predetermined code correspondence to each of the terminal groups X, Y and Z by means of jumper wiring JP. In this case, only one of the 1,000 "AND" circuits shows logic "1" by the input information A, B and C all of which are in the form of "1-out-of-10" codes, which results in coded outputs X, Y and Z by the jumper connections. These relay and electronic code translation circuits are provided with the translating capabilities of one direction, that is for example, A, B, C→V, W, X, Y; A, B, C→X, Y, Z, but are devoid of the translation capabilities in the reverse direction such as V, W, X, Y→A, B, C; X, Y, Z→A, B, C. Thus, it is required to provide separate units to perform code translation in the reverse direction.

Figure 3:
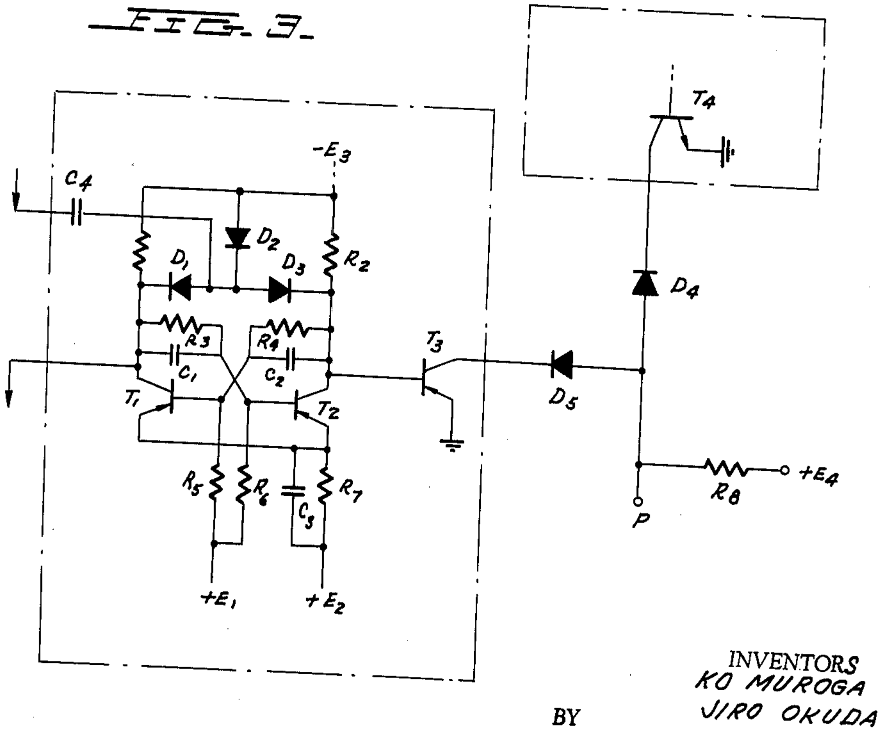
FIGURE 3 is a circuit diagram illustrating the basic design and operation of an electronic selection gate circuit of the type which may be employed in the system of the instant invention.

Now, a simple description will be made of the basic structures of the logic circuits necessary for clarifying this invention with reference to FIGURES 3 through 6. In FIGURE 3, let us consider the operation of the circuitry comprising transistor $T_3$ controlled by a counter circuit consisting of transistors $T_1$ and $T_2$, diodes $D_1$ through $D_3$, resistors $R_1$ through $R_7$, and capacitors $C_1$ through $C_4$, transistors $T_4$ controlled by a similar counter circuit, diodes $D_4$ and $D_5$ whose negative terminals are connected to collectors of the transistors $T_3$ and $T_4$ respectively, while their positive terminals are connected to each other at point P, and resistor $R_8$ whose one end is connected to point P with the other end connected to potential $+E_4$. When both transistors $T_3$ and $T_4$ are conducting, point P is at the ground potential. This holds true for a case in which either transistor $T_3$ or $T_4$ is conducting. Only when both transistors $T_3$ and $T_4$ are simultaneously cut off, the potential at point P becomes $+E_4$. By letting $+E_4$ and ground potential correspond to logic "1" and logic "0" respectively, it is considered that a combination of resistor $R_8$ and diodes $D_4$ and $D_5$ constitutes an "AND" circuit.

Figure 4:
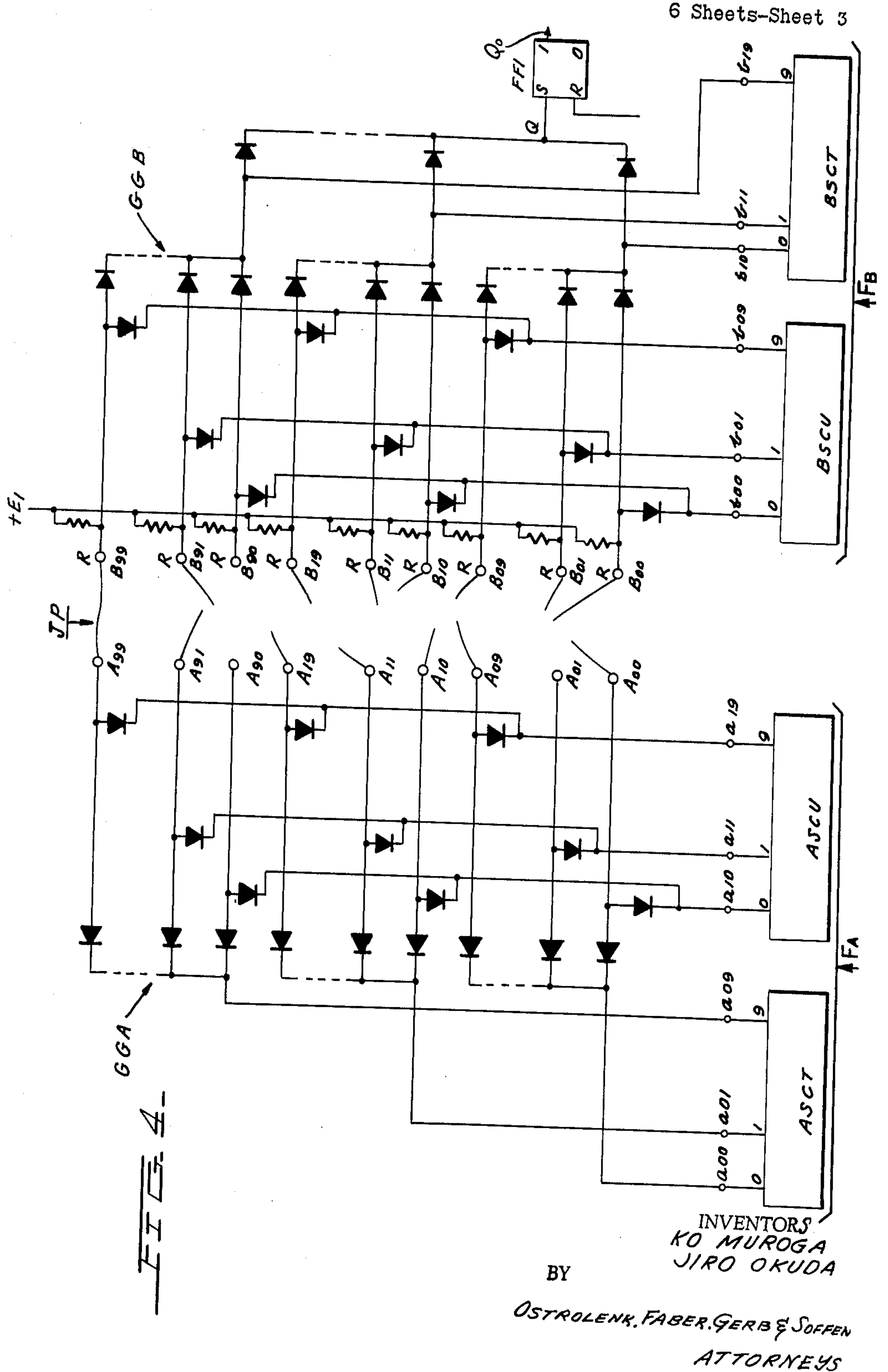
FIGURE 4 is a circuit diagram of one preferred embodiment of a tree-type expansion circuit and its associated peripheral circuitry employed in the bidirectional code translation system of this invention.

FIGURE 4 illustrates a basic structure of the expansion circuits and the associated circuits as used for this invention. Referring to this figure, each of "ASCU," "ASCT," "BSCU," and "BSCT" is a decimal counter circuit as set forth in "Pulse and Digital Circuits" by Millman and Taub, published by McGraw-Hill, 1956, pages 323 through 353, the output of each counter circuit being a "1-out-of-10" code. Each cyclic stage of this counter circuit by no means needs to be decimal or 10, however, as far as this invention is concerned, the number of cyclic stages being capable of a greater or smaller number as required. Further, a number of methods are conceivable for the code type of "1-out-of-$x$" such as a method, for example, by which a binary counter circuit output is sent out through a translating gate circuit. These methods, which are not directly concerned with the present invention, are omitted for brevity.

Now, let the network consisting of the diodes which are connected between counter circuits "ASCT," "ASCU" and terminals "A00" through "A99" be called the expansion circuit GGA, and let terminals $a_{00}$, $a_{01}$ . . . $a_{09}$, $a_{10}$, $a_{11}$ . . . $a_{19}$ connected to the counter circuits, and terminals "$A_{00}$" through "$A_{99}$" be called the control terminals, and the expansion terminals respectively. It will be evident that the counter circuits "BSCU" and "BSCT" are connected to a similar expansion circuit "GGB". Positive potential $+E_1$ is applied to each of the expansion terminals $B_{00}$, $B_{01}$ . . . $B_{99}$ through resistor R. Each terminal of the counter circuit "BSCT" is connected to the end terminal Q through diodes, this terminal Q being connected to the flip-flop $FF_1$ used as a detector circuit. Further, jumper wiring JP is connected in accordance with the translated code between the expansion terminal groups $A_{00}$ through $A_{99}$ and $B_{00}$ through $B_{99}$ on which the outputs of expansion circuits GGA and GGB appear, respectively.

Suppose the counter circuits "ASCU" and "ASCT" have been fixed to a certain value determined by the input information $F_A$. In this state, one terminal in each 10-terminal group of "ASCU" and ASCT" differs from the ground potential, with the result that one terminal $Aij$ out of 100 terminals $A_{00}$ through $A_{99}$ becomes logic "1" in accordance with the principles of the "AND" circuit as has been described in connection with FIGURE 3. (Note that in this case $Aij$ fails to become logic "1" because of the presence of "AND" circuits which are connected to the output sides of the counter circuits "BSCU" and "BSCT," but the influence of these "AND" circuits are ignored.)

In this state, let counter circuits "BSCU" and "BSCT" advance at a constant repetition frequency. Then, when one terminal $B_{kl}$ of 100 terminals $B_{00}$ through $B_{99}$ to which $A_{ij}$ is connected by the jumper wiring arrives at a position of the counter circuits "BSCU" and "BSCT" such that said terminal $B_{kl}$ becomes logic "1," a current flows to the end terminal Q from the power source $+E_1$ through resistor R and diodes to set the detector circuit, or flip-flop $FF_1$. The use and operation of FIGURE 4 is as follows:

The input information $F_A$ for which code translation is desired is set into the counters ASCT and ASCU in any suitable manner. The input information may be in the form of a sequence of triggering pulses applied in a symmetrical fashion as described on page 323 of the previously mentioned text "Pulse and Digital Circuits" by Millman and Taub. Another well known reference which describes such counter circuits which may be stepped by input pulses is set forth in the text "Arithmetic Operations in Digital Computers" by R. K. Richards, Copyright 1955 by Van Nostrand Company, Inc. Descriptions of such typical counters are set forth in pages 193 through 198, 201 through 205, 208 and 230 through 237. The counter circuits BSCU and BSCT are then advanced preferably in a sequential fashion until the diode logic circuits GGA and GGB which are connected through jumper wires JP, recognize comparison between the input information appearing at the output terminals of counters ASCT and ASCU and the states to which the counters BSCU and BSCT have been set. This generates an output pulse at the terminal Q causing the flip-flop $FF_1$ to generate a signal at its output terminal $Q_0$ to indicate that the translated code operation has been completed.

The bidirectional code translation circuit of FIGURE 4 may be used in the reversed direction by setting in the code information $F_B$ into the counters BSCU and BSCT and then advancing the counters ASCT and ASCU in a step-like fashion until an output signal is generated at terminal Q causing the flip-flop circuit $FF_1$ to develop a signal at its output terminal $Q_0$ to indicate that the code translation operation in the reverse direction has been completed. In other words, the circuit of FIGURE 4 is capable of realizing bidirectional code translation using the same circuit.

Figure 5:
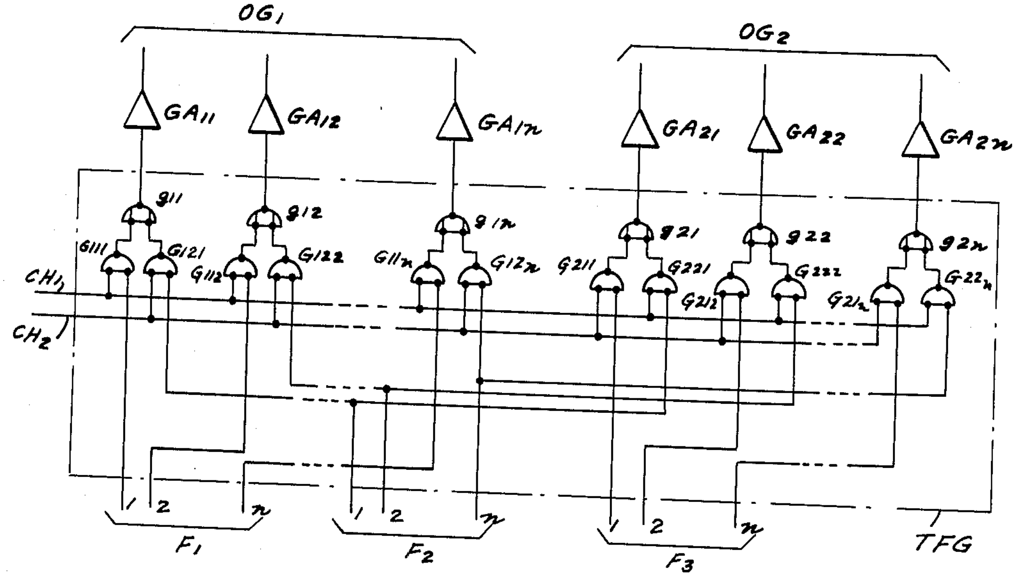
FIGURE 5 is a logical circuit diagram of a transfer gate circuit of the type employed in the bidirectional code translation system of this invention.

FIGURE 5 illustrates an example of the transfer gate circuit. Before consideration of FIGURE 5, attention is drawn to the symbolic representation of the OR gates and AND gates of the instant application. In the case of an OR gate, its operation is such that when either of its input terminals receives a binary one signal its output terminal will be binary one. Also if both of its input terminals are binary one, its output terminals will likewise be binary one. In the case of the AND gate, a binary one level will be developed at its output terminal only upon the simultaneous presence of binary one levels at both of its input terminals. In all other cases, the output of the AND gate will be binary zero. The input terminals on one side of the "AND" circuits $G_{111}$ through $G_{11n}$ are connected to terminal bus $CH_1$ while those on the other side thereof are connected to the input circuit of information $F_1$. Further, the input terminals on one side of the "AND" circuits $G_{211}$ through $G_{21n}$ are connected to terminal bus $CH_2$ while those on the other side thereof are connected to the input circuit of information $F_3$. In a similar manner, the input terminals on one side of $G_{121}$ through $G_{12n}$ and those on the other side are connected respectively to terminal bus $CH_2$ and the input circuit of information $F_2$ while the input terminals on one side of $G_{221}$ through $G_{22n}$ and those on the other side are respectively connected to terminal bus $CH_1$ and the input circuit of information $F_2$. Output terminals of "AND" gate circuits $G_{111}$ and $G_{121}$; $G_{112}$ and $G_{122}$; . . . $G_{11n}$ and $G_{12n}$ are respectively connected to the input circuits of "OR" circuits $g_{11}, g_{12} \ldots g_{1n}$ while the output terminals of these "OR" circuits are led to output "$OG_1$" respectively through amplifiers $GA_{11}$, $GA_{12}$; . . . $GA_{1n}$. Further, the output terminals of "AND" circuits $G_{211}$ and $G_{221}$; . . . $G_{21n}$ and $G_{22n}$ are connected to the input circuits of $g_{21}, g_{22} \ldots g_{2n}$, the output terminals of these "OR" circuits becoming the output $OG_2$ through amplifiers $GA_{21}, GA_{22} \ldots GA_{2n}$. The network consisting of these "AND" and "OR" circuits constitutes the transferring gate circuit.

The operation of this gate circuit will now be explained. Where both terminal buses $CH_1$ and $CH_2$ are set to logic "0," both outputs $OG_1$ and $OG_2$ become logic "0" irrespective of the information content of inputs $F_1$, $F_2$, and $F_3$. When $CH_1$ becomes logic "1" and $CH_2$ remains logic "0," information $F_1$ appears as an output at $OG_1$ while informatoin $F_2$ appears at $OG_2$. On the other hand, when $CH_2$ becomes logic "1" and $CH_1$ returns to logic "0," information $F_2$ appears at $OG_1$ while information $F_3$ appears at $OG_2$. An example of an actual circuit comprising the "AND" and "OR" circuits as used in FIGURE 5 is illustrated in FIGURE 6.

Figure 6:
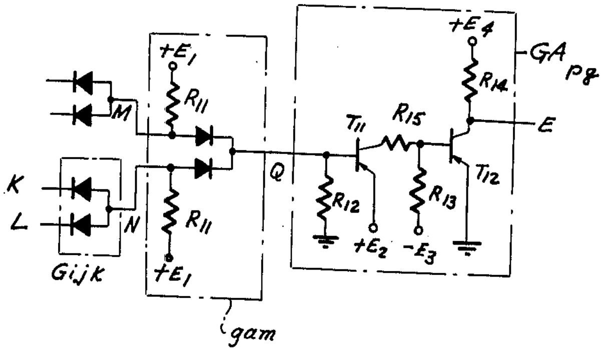
FIGURE 6 is a schematic diagram of a portion of the logical circuitry employed in the code translation system of this invention.

Referring to FIGURE 6, the "AND" circuit $G_{ijk}$ consists of two diodes, the negative sides of which are input terminals K and L while the positive sides are connected to each other and form an output terminal N (or M). The "OR" circuit $g_{am}$ contains two diodes and two resistors, the positive sides of said diodes are input terminals M and N while the negative sides are connected in common to output terminal Q. A potential $+E_1$ is applied to each of input terminals M and N through resistors $R_{11}$. The amplifier $GA_{pg}$ contains a PNP transistor $T_{11}$, an NPN transistor $T_{12}$ and resistors $R_{12}$, $R_{13}$, $R_{14}$ and $R_{15}$. The base of transistor $T_{11}$ is grounded through resistor $R_{12}$ while the collector of transistor $T_{11}$ is connected to the base of transistor $T_{12}$ through $R_{15}$. The emitter of transistor $T_{12}$ is grounded while potential $+E_2$ is applied to the emitter of transistor $T_{11}$ and potential $-E_3$ is applied to the base of transistor $T_{12}$ through resistor $R_{13}$ and further, potential $+E_4$ is applied to the collector of transistor $T_{12}$ through resistor $R_{14}$. The base of transistor $T_{11}$ is connected to the input terminal Q while the collector of transistor $T_{12}$ is connected to the output terminal E.

Referring to FIGURE 6, when both K and L (or either K or L) of the "AND" circuit are at the ground potential, or logic "0," point N is at the ground potential. If point M is also at the ground potential, both transistors $T_{11}$ and $T_{12}$ become conducting causing point E to be at ground potential, or logic "0." Where both K and L have a high resistance with respect to the ground, i.e. logic "1," both transistors $T_{11}$ and $T_{12}$ become cut-off, and the potential at point E becomes $+E_4$, or the logic binary "1" level.

FIGURE 7 illustrates a first embodiment of the invention. GGA and GGB denote the same expansion circuits as explained in FIGURE 4. To the control terminals $a_{00} \ldots a_{29}$ and $b_{00} \ldots b_{29}$ of the expansion circuits GGA and GGB are given the outputs of the same kind of transferring gate circuit TFG as described in FIGURE 5 through amplifiers GA's.

By using this transferring gate circuit TFG, the code selection counter circuits ASCU, ASCT, BSCU, and BSCT of FIGURE 4, which would otherwise be necessary for the expansion circuits GGA and GGB in performing bidirectional code translation may be reduced to one set of counter circuits on one hand and the control operation of the code translation circuit can be simplified on the other. SCU, SCT, and SCH denote the counter circuits while SQC denotes the group selection control counter circuit consisting of flip-flops $FF_2$, $FF_3$ and two "AND" circuits $G_1$ and $G_2$. The output terminal I of circuit $FF_2$ is connected to the input terminals of one side of the "AND" circuits $g'_{00}, g'_{01} \ldots g'_{09}$ while the output terminal H of AND gate $G_1$ is connected to the input terminals of one side of the "AND" circuits $g'_{10}, g'_{11}, \ldots g'_{19}$. Table 1 shows the relations of the counting output state of the group selection control counter circuit to the corresponding outputs appearing at the output terminals H and I.

*Table 1*

| S | Output State | | 0 | 1 | 2 | 3 |
|---|---|---|---|---|---|---|
| Q | $FF_2$ | 0 | 1 | 1 | 0 | 0 |
| | | 1 | 0 | 0 | 1 | 1 |
| C | $FF_3$ | 0 | 1 | 0 | 1 | 0 |
| | | 1 | 0 | 1 | 0 | 1 |
| H | | | 1 | 0 | 0 | 0 |
| I | | | 1 | 1 | 0 | 0 |

SQC is a two stage binary counter circuit composed of the flip-flop circuits $FF_2$ and $FF_3$. $FF_3$ is the first stage flip-flop and $FF_2$ is the second stage flip-flop of the counter circuit SQC. The terminal H is the output of the AND gate $G_1$, on which logic "1" appears only when both flip-flop circuits $FF_2$ and $FF_3$ are in the reset state, namely the output state of the SQC is in the "0" state. The lead I is connected to the output on "0" side of the $FF_2$, on which lead I logic "1" appears only when $FF_2$ is in the reset state. This state means the stage of the SQC is "2" or "3."

The outputs of the counter circuit SCU are connected to the input terminals on the other side of the "AND" circuits $g'_{00}, g'_{01} \ldots g'_{09}$ while the outputs of the counter circuit SCT are connected to the input terminals on the other side of the "AND" circuits $g'_{10}, g'_{11} \ldots g'_{19}$. The outputs of these "AND" circuits become the inputs of the transferring gate circuit "TFG" while the outputs of the counter circuit "SCH" are the inputs to the transferring gate circuit "TFG." In addition, information groups $F_1$ and $F_3$ are applied to the transferring gate circuit "TFG" as inputs. The control circuit CONT is also provided to control the counter circuits "SCU," "SCT," "SCH" "SQC" as well as the flip-flop $FF_1$.

The circuit of FIGURE 7 is capable of code translation in either direction. Now the operation of this circuit will be described referring to a case in which the input $F_1$ is sent out through the "GGA" side and in response to this a code-translated output is obtained from the "GGB" side. Let it be assumed in this case that $CH_1$ be set to binary "1" level and $CH_2$ binary "0."

The input signal $F_1$ appears at control terminals $a_{00}$ through $a_{29}$ from the output side of the transferring gate circuit TFG through amplifiers GA. In this case, the group selection control counter circuit SQC is at "0" counting position, shown in Table 1, so that both flip-flops in the group selection counter circuit SQC are set to logic level "0." Accordingly, both outputs H and I of the group selection counter circuit are set to logic "1" (see Table 1). Since these outputs H and I become the inputs to the "AND" circuits $g'_{00}$ . . . $g'_{19}$ together with the outputs of the counter circuits "SCU" and "SCT," all output signals applied to control terminal groups $b_{00}$–$b_{09}$ and $b_{10}$–$b_{19}$ through amplifiers $GA_2$ are set to logic "1." It will be noted that in this situation the outputs of the counter circuit SCH appear at the input terminals $b_{20}$ through $b_{29}$.

Under these conditions, counter circuit SCH is advanced so that it may arrive at a predetermined coded output condition. When this condition is achieved, the detector circuit of flip-flop $FF_1$ which is connected to the end terminal Q is driven to its SET state. The counter circuit SCH stops at this output condition under control of the control circuit CONT. Control circuit CONT simultaneously causes group selection control circuit SQC to advance one step to reach the output state "1" (see Table 1), via lead C–1, and causes the flip-flop $FF_1$ to reset via lead C–2. When the group selection control circuit SQC advances one step to reach the output state "1," the output I retains logic "1" while the output H becomes logic "0" and the outputs of the counter circuit SCT appear as outputs from control terminals $b_{10}$ through $b_{19}$ through the transferring gate circuit TFG and amplifiers $GA_2$. Hereupon, the counter circuit SCT is advanced for code selection via lead C–3 and upon its arrival at the predetermined output state, the flip-flop $FF_1$ is set once more to cause the counter circuit SCT to stop at the next desired state, the group selection control counter circuit SQC to advance one step, to reach the output state "2," and, the flip-flop $FF_1$ to reset.

When the group selection control counter circuit SQC reaches the output state "2," the "AND" gates $g'_{00}$–$g'_{09}$ are unblocked so that the outputs of the counter circuit SCU become the signals from the transferring gate circuit TFG to control terminals $b_{00}$ through $b_{09}$. Upon completion of the same code selection as mentioned previously by the counter circuit SCU, the group selection control counter circuit SQC further advances by one step to its output step "3" of Table 1 and a signal for completion of selection is sent out to the control circuit CONT via "AND" gate $G_2$ and lead C–4 to terminate the code selection operation. By using the group selection circuit as such, a maximum of thirty steps of advancement of the counter circuit will be accomplished for selection of one code out of 1000 codes, for example, with the result that code selection can be performed quite rapidly.

FIGURE 8 illustrates a second embodiment of this invention. For example, it is a common practice that the telephone exchange number group equipment is required to supply information regarding the subscriber class in addition to code translation from the subscriber directory number to the subscriber equipment number. In such a case, it is necessary to generate two types of output codes from one input code. For such a requirement, this invention becomes extremely useful. Stated specifically, jumper wiring is provided from one input-side expansion circuit GGA to each of the two output-side expansion circuits GGB and GGC in accordance with each translation code. Suppose that, in FIGURE 8, an input signal $F_A$ has entered into the expansion circuit GGA. In order to obtain the translated code outputs $F_B$ and $F_C$, which correspond to the input $F_A$, for the expansion circuits GGB and GGC, the procedure is divided into two steps. In the first step, all of the control input terminals of one expansion circuit, for example $F_C$ of GGC, are preset to logic "1," enabling code translation for GGB to be performed. Thereafter, in the second step code translation regarding GGC is performed in the same manner. Thus, two kinds of translation codes can be obtained from one kind of code.

FIGURE 9 illustrates the third example of an embodiment of this invention. This circuit comprises a plurality of expansion circuits $GG_0$ through $GG_m$, jumper wiring JP to connect among expansion terminals V through $V_m$ in accordance with the translation code; a circuit "CONTL" being connected to the expansion circuits and consisting of suitable control circuits, counter circuits, and transferring gate circuits to control terminal groups $S_0$ through $S_m$ of the expansion circuits, and a detector circuit which is connected to any end terminal $Q_n$ ($n$=0, 1, . . . $m$) of an arbitrary expansion circuit.

There is no restriction that the number of control terminals for each expansion circuit should be the same. Such a circuit as shown in FIGURE 9 has three principal applications, all of these three applications can be performed by the same circuit.

As the first application, a set of control input signals is impressed upon one expansion circuit, for example, $GG_0$, while the code translation information is derived from a part or all of the remaining expansion circuits $GG_1$—$m$ in the same manner as described for FIGURE 8.

As a second application, a part of the inputs to one expansion circuit, for example, control terminals $S_0$ (0–$n_0$) of $GG_0$ are set to logic "1" level, and a set of control input signals is given to the remaining terminals so that outputs may appear at a plurality of output terminals $V_0$ (0–$1_0$), and at the same time, another set of control input signals is given to another expansion circuit, say $GG_1$ (in this case also, a part of input terminals of $GG_1$ may be set logic "1") so that one or more outputs appear at $V_1$. By combining these two expansion outputs $GG_0$ and $GG_1$, it can be arranged such that only one of these expansion outputs may become logic "1." This logic "1" position is now used to translate to the corresponding information by using a part or all of the remaining expansion circuits. It is also possible to make the translated information the combined information of the two expansion circuits in the same way as the aforementioned input information. With reference to the aforementioned combined input, it has been assumed that a part of control input signals to $GG_0$ are set logic "1," but this function can be performed with smaller numbers of control input terminals and expansion output terminals. In this case, several jumper wires may be connected to one expansion output terminal, and the necessity for using decoupling diodes may result.

Although a description has been made above referring to a case in which two expansion circuits are used for the combined input and combined output, it is also possible to constitute a combined input and output for more than two expansion circuits.

As a third application, a part of the input terminals of $S_0$ (0–$n_0$) of an expansion circuit, say $GG_0$ are set to the logic "1" condition, and a set of control input signals is impressed upon the remaining terminals so that a plurality of outputs appear in $V_0$ (0–$1_0$). The said plurality of expansion outputs are then scanned by using the predetermined sets (a part or all) of the remaining expansion circuits to select any one of a plurality of the corresponding translated outputs as an output. This application provides a method of using the code translation circuit with a high degree of freedom and flexibility. As a method of developing a plurality of expansion outputs as mentioned previously, use of an expansion circuit with smaller numbers of control input terminals and expansion output terminals is also acceptable. It is also possible to obtain a plurality of expansion outputs with a combined input that employs two or more expansion circuits. As regards the output information, further, it is possible to employ such a selection method as selecting one out of a plurality of information outputs which is analogous to the aforementioned combined input expansion method. Therefore, the code translation circuit is provided with a high degree of freedom and can perform code translation for inputs to outputs of one to one, one to a plural number, a plural number to one, or a plural number to a plural number by making the numbers of the input side expansion circuits and the output side expansion circuits either one or a plural number.

Although a description has been made above referring to the three applications in which the translation is unidirectional, translation in the reverse direction is also possible—that is, bidirectional code translation is possible. The above-mentioned three applications can be effected with but one circuit composition, but unnecessary code translation circuits and expansion output terminals can be eliminated as required. In other words, the number of expansion output terminals is not decided solely by the information inputs of the expansion circuit, it being decided freely in accordance with the translated code.

While the principles of this invention have been described above in connection with specific embodiments related to the telephone switching system, it is to be clearly understood that the scope of application of this invention is by no means restricted to the telephone exchange system, but covers electronic computers, digital control equipment, and digital communication equipment and the like which require bidirectional code translation operations performed in a rapid and reliable manner, or the very features of this invention.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

The embodiments of the invention in which an exclusive privilege or property is claimed are defined as follows:

1. A bidirectional code translation circuit comprising at least two expansion circuits each being provided with a plurality of input control terminals for receiving any input information combinations, a plurality of expansion terminals corresponding to the number of information input combinations for which discrimination is required, an end terminal, and a logical network connected between said expansion terminals and said input control terminals, jumper means for connection of the expansion terminals of said expansion circuits in accordance with the predetermined combinations, at least one multiple stage counter circuit capable of counting any required number being connected to the control terminals of one of said expansion circuits, a detector circuit connected to at least one of the end terminals of one of said expansion circuits, means for applying an input to one of said expansion circuits employed as an information input expansion circuit for generating an output at one expansion terminal for each valid input information combination of said expansion circuit and means for applying inputs of different combinations in succession by said counter circuit to the input control terminals of the remaining expansion circuits employed as an information translation expansion circuit, means for applying a signal to the aforementioned detection circuit upon completion of the code translation operation, said detection circuit being connected to said counting circuit, said counting circuit providing an information translation output of the information translation expansion circuit corresponding to the input information translated by the information input expansion circuit, said jumper means connected between said expansion circuits for enabling each of these information translation expansion circuits to be used as required as either an information input expansion circuit or an information translation expansion circuit so that code translation for inputs to outputs of the expansion circuits are provided with high degree of freedom as well as being capable of performing code translation in the reverse direction.

2. A bidirectional code translation circuit comprising at least two expansion circuits each being provided with a plurality of control terminals for receiving any equal in number to the total number of input information combinations, a plurality of expansion terminals corresponding to the number of information input combinations for which discrimination is required, an end terminal, and a logical network connected between said expansion terminals and said input control terminals, jumper means for connecting said expansion terminals of said expansion circuits in accordance with predetermined combinations, a plurality of counter circuits capable of counting any required number being connected to said control terminals of each expansion circuit, a detector circuit connected to at least one of said end terminals of said expansion circuits, a group selection control circuit connected to sequentially operate each of said counter circuits, means for applying an input to one of said expansion circuits employed as an information input expansion circuit for generating an output for each valid input information combination of said one of the expansion circuits, means for applying inputs of different combinations in succession by said counter circuits to said control terminals of the remaining expansion circuit employed as an information translation expansion circuit, said different combinations being given in the manner of group selection, means for repeating said group selection in order to complete the code translation in fewer steps of operation of said counter circuits, and means connected between said expansion circuits for enabling each of said information translation expansion circuits to be used as required as either of an information input expansion circuit and an output information expansion circuit so that code translation for inputs to outputs of said expansion circuits are provided with high degree of freedom as well as being capable of performing code translation in the reverse direction.

3. A bidirectional code translation circuit comprising at least two expansion circuits each being provided with a plurality of input control terminals for receiving any of the input information combinations, a plurality of expansion terminals corresponding to the number of information input combinations for which discrimination is required, an end terminal, and a logical network connected between said expansion terminals and said input control terminals, jumper means for connection of the expansion terminals of said expansion circuits in accordance with the predetermined combinations, at least one multiple stage counter circuit capable of counting any required number being connected to the input control terminals of any one of said expansion circuits, a detector circuit connected to at least one of the end terminals of one of said expansion circuits, a voltage source connected to each of said expansion terminals of one of said expansion circuits through a resistor means, means for selecting at least one of said expansion circuits employed as an information input expansion circuit to apply input information to said input control terminals thereof, means for applying input information of different combinations in succession by said counter circuit to the input control terminals of the remaining expansion circuits employed as an information translation expansion circuit and means for controlling said counter circuits; each logical network comprising diode means coupled by said input control terminals and said expansion terminals for establishing a logical "1" state at each of said expansion terminals wherein only one of said expansion terminals is in logical "1" state at any given instant, representing one of said input combinations; the voltage from said voltage source coupled to said end terminal only when an expansion terminal of said information translation expansion circuit and an associated expansion terminal of said information input expansion circuit, coupled by said jumper means, are both in logical state "1" caused by said input information applied to said information input expansion circuit and by advancing the counter means of said information translation expansion circuit, said detector circuit detecting said voltage appearing at said end terminal, and said controlling means being connected between said detector circuit and said counter circuits for stopping the operation of said counter circuits in response to detecting of said voltage, said counting circuit providing an information translation output of the information translation expansion circuit corresponding to the input information to be translated, said jumper and means connected between said expansion circuits for enabling each of these information translation expansion circuits to be used as required as either an information input expansion circuit or an information translation expansion circuit so that code translation for inputs to outputs of the expansion circuits are provided with high degree of freedom as well as being capable of performing code translation in the reverse direction.

4. A bidirectional code translation circuit comprising at least two expansion circuit means, each being comprised of a plurality of input control terminals for receiving any of the input information combinations, a plurality of expansion terminals corresponding to the number of information combinations to be discriminated, and logical network means selectively connecting said input control terminals to said expansion terminals; jumper means selectively connecting the expansion terminals of at least two of said expansion circuit means; multiple stage counter means capable of counting any predetermined number; means for connecting said counter means to one of said expansion circuit means when one of the remaining expansion circuit means is receiving input information, and for connecting said counter means to one of said remaining expansion circuit means when said one remaining expansion circuit means is receiving input information; means for advancing said counter means; detection circuit means connected to one of said expansion circuit means for indicating completion of the code translation operation; means connected to said detection circuit means for inhibiting the advancing operation of said counter means when said detection circuit means completes said code translation operation.

5. A bidirectional code translation circuit comprising at least two expansion circuit means, each being comprised of a plurality of input control terminals for receiving any of the input information combinations, a plurality of expansion terminals corresponding to the number of information combinations to be discriminated, and logical network means selectively connecting said input control terminals to said expansion terminals; jumper means selectively connecting the expansion terminals of at least two of said expansion circuit means; multiple stage counter means capable of counting any predetermined number; means for connecting said counter means to one of said expansion circuit means when one of the remaining expansion circuit means is receiving input information; means for advancing said counter means; detection circuit means connected to one of said expansion circuit means for indicating completion of the code translation operation; means connected to said detection circuit means for inhibiting the advancing operation of said counter means when said detection circuit means completes said code translation operation.

References Cited by the Examiner

UNITED STATES PATENTS

| | | | |
|---|---|---|---|
| 2,633,498 | 3/1953 | Schneckloth | 179—18 |
| 2,686,838 | 8/1954 | Dehn | 179—18 |
| 2,724,019 | 11/1955 | Gohorel | 179—18 |
| 2,851,534 | 9/1958 | Bray et al. | 179—18 |
| 2,912,511 | 11/1959 | Mckin | 179—18 |

ROBERT H. ROSE, *Primary Examiner.*

MALCOLM A. MORRISON, WALTER L. LYNDE, *Examiners.*

K. R. STEVENS, S. H. BOYER, *Assistant Examiners.*